United States Patent
Ogura et al.

(10) Patent No.: US 6,594,583 B2
(45) Date of Patent: Jul. 15, 2003

(54) SIDE-MONITORING APPARATUS FOR MOTOR VEHICLE

(75) Inventors: Hiroyuki Ogura, Shizuoka (JP); Naoto Ishikawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 145 days.

(21) Appl. No.: 09/770,387

(22) Filed: Jan. 29, 2001

(65) Prior Publication Data

US 2001/0012982 A1 Aug. 9, 2001

(30) Foreign Application Priority Data

Jan. 31, 2000 (JP) ........................................ 2000-022114

(51) Int. Cl.$^7$ ............................ G01S 1/00; G06F 17/10; G06G 7/78; B60Q 1/00; G06K 9/00
(52) U.S. Cl. ..................... 701/301; 701/45; 382/104; 340/903; 340/937; 340/435; 340/436
(58) Field of Search ................... 701/301, 45; 340/903, 340/937, 435, 436; 342/29, 41, 455, 70, 104, 109, 105; 382/104

(56) References Cited

U.S. PATENT DOCUMENTS

| | | | |
|---|---|---|---|
| 5,128,874 A | * 7/1992 | Bhanu et al. | 342/55 |
| 5,365,603 A | * 11/1994 | Karmann | 382/103 |
| 5,521,633 A | * 5/1996 | Nakajima et al. | 348/118 |
| 5,777,690 A | * 7/1998 | Takeda et al. | 348/155 |
| 6,049,619 A | * 4/2000 | Anandan et al. | 382/103 |
| 6,246,961 B1 | * 6/2001 | Sasaki et al. | 701/117 |
| 6,259,359 B1 | * 7/2001 | Fujinami et al. | 340/435 |
| 6,292,111 B1 | * 9/2001 | Ishikawa et al. | 180/167 |
| 6,330,511 B2 | * 12/2001 | Ogura et al. | 340/435 |

OTHER PUBLICATIONS

Hatsopoulus et al., Collision Avoidance system based on optical flow, Proceedings of the Intelligent Vehicles '92 Symposium, pp. 79–84.*

Gillner, W.J.; Motion Based Vehicle Detection on Motorways, Proceedings of the Intelligent Vehicles '95 Symposium, pp. 48 487.*

Enklemann et al.; Obstacle Detection by Real–Time Optical Flow, Proceedings of the Intelligent Vehicles '94 Symposium, p. 97–102.*

* cited by examiner

Primary Examiner—Jacques H. Louis-Jacques
Assistant Examiner—Brian J Broadhead
(74) Attorney, Agent, or Firm—Armstrong, Westerman & Hattori, LLP (57) ABSTRACT

An image pick-up means mounted in the motor vehicle picks up a side direction of a driver's own vehicle. An approaching object detecting means detects an approaching degree of an approaching object which approaches his own vehicle from a side direction road crossing his own vehicle on the basis of two images picked up at two timings apart by a prescribed interval by the image pick-up means. A danger decision means decides a danger on the basis of the approaching degree. In such a configuration, a side-monitoring apparatus for a motor vehicle can accurately know the danger of collision with the object approaching from the side direction road.

9 Claims, 9 Drawing Sheets

TIMING t

FIG. 8B

TIMING t+Δt

FIG. 8C

TIMING t+Δt

SIDE-MONITORING APPARATUS FOR MOTOR VEHICLE

BACKGROUND OF THE INVENTION

1. Field of the Invention

This invention relates to a side-looking or monitoring apparatus for a motor vehicle which can monitor an object such as a man or a vehicle which approaches from a side direction road when a driver's own vehicle approaches an intersection or outgoes from a garage facing the road, thereby ascertaining safety.

2. Description of the Related Art

When the driver's own vehicle approaches the intersection with bad visibility or outgoes from the garage facing a road, a driver stops the vehicle to ascertain left and right safety, and when he decides there is no approaching object, approaches the side direction road intersecting his own vehicle. However, the distant place of the side direction road is often out of hid sight as long as the vehicle does not approaches the side direction road to a certain degree. Therefore, the object such as another vehicle approaching from the far distance of the side direction road is out of his sight. In this case, there is a fear of a collision accident as a result that his own vehicle as-is approaches the side direction road without noticing the object.

Figure 9A:
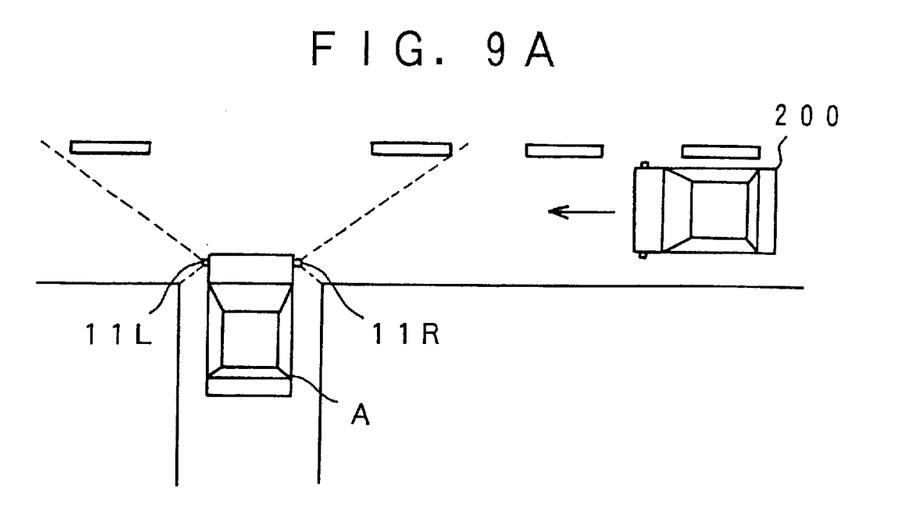
FIGS. 9A and 9B are views for explaining an example of a conventional side-monitoring apparatus for a motor vehicle.
Figure 9B:
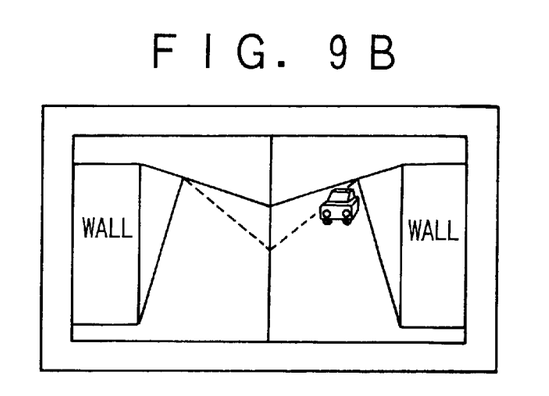

In order to obviate such a fear, a side-monitoring apparatus for a motor vehicle as shown in FIG. 9 has been proposed in which images on both side directions of the vehicle picked up by cameras mounted toward both side directions are displayed on a display to assure the sight of the driver before the vehicle approaches the side direction road.

However, when the above side-monitoring apparatus is used, the driver must eye the display for safety ascertainment, and may miss the other vehicle displayed on the display. Further, when the driver only sees the display, it is difficult for him to decide whether or not the approaching object running on the side direction road may collide with his own vehicle.

SUMMARY OF THE INVENTION

Under the circumstance described above, an object of this invention is to provide a side-monitoring apparatus for a motor vehicle which can automatically decide the danger of collision with an object approaching from a side direction road using the image acquired by an image pick-up means mounted on the vehicle so that the present status of the side direction road can be known accurately.

Figure 1A:
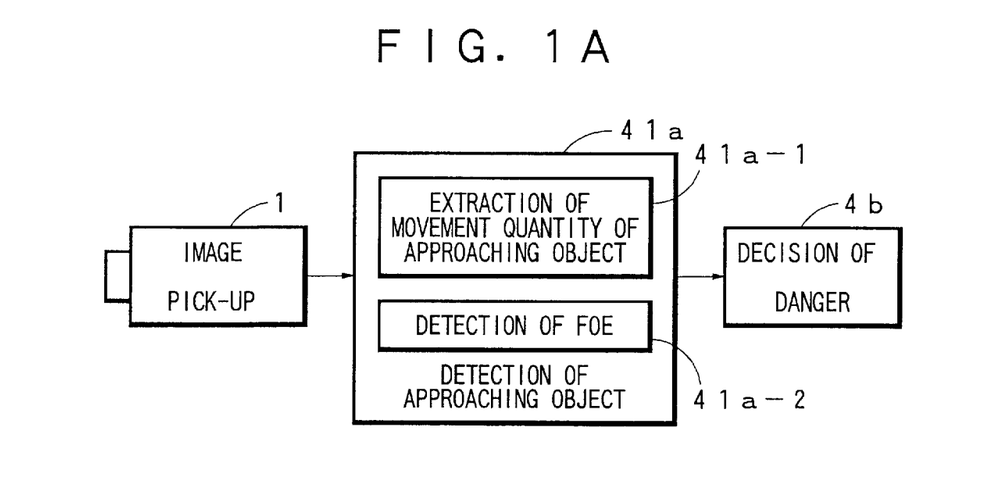
FIGS. 1A and 1B are block diagrams each showing a basic arrangement of a side-monitoring apparatus for a motor vehicle according to this invention.
Figure 1B:
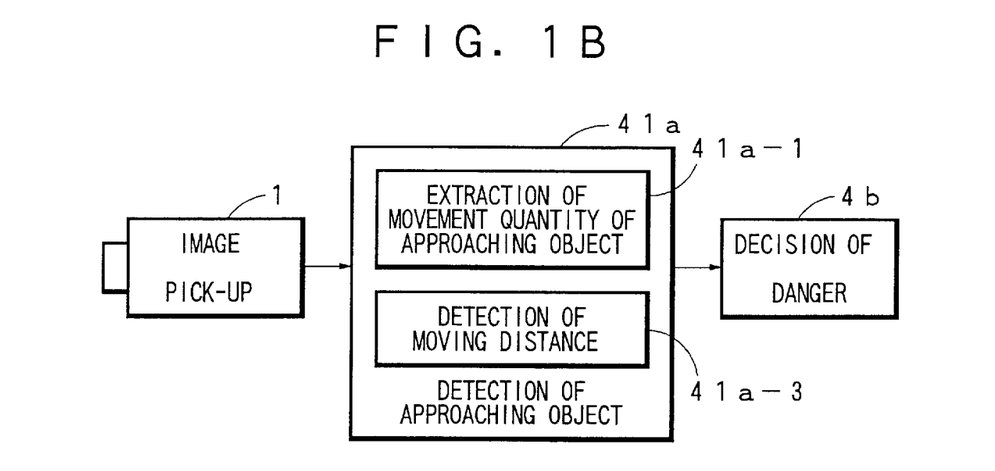

In order to attain the above object, in accordance with this invention, as shown in FIG. 1, there is provided a side-monitoring apparatus for a motor vehicle comprising: image pick-up means 1 mounted in the motor vehicle for picking up an image of a side direction of the vehicle; approaching object detecting means 41a for detecting approaching degree of an approaching object which approaches a driver's own vehicle from a side direction road crossing his own vehicle on the basis of two images picked up at two timings apart by a prescribed interval by the image pick-up means; and danger decision means 41b for deciding a danger on the basis of the approaching degree. In this configuration, using the images picked up by the image pick-up means mounted in the driver's own vehicle, the danger of collision with the object approaching from the side direction road of his own vehicle can be automatically decided.

Preferably, the approaching object detecting means comprises movement quantity extracting means 41a1 for extracting a movement quantity having a component of a direction approaching the driver's own vehicle from a movement quantity of the same object between the two images picked up by the image pick-up means, the extracted movement quantity representing the movement quantity of the approaching object, wherein the approaching degree is detected in terms of a location and magnitude of the movement quantity of the approaching object. In this configuration, using the images picked up by the image pick-up means installed at the driver's own vehicle, the danger of collision with the object approaching from the side direction road of his own vehicle can be automatically decided.

Preferably, the approaching object extracting means extracts the movement quantity of the approaching object by detecting only the movement quantity of the same object having the component of the direction approaching the driver's own vehicle and a component of the direction his own vehicle is running or to run. In this configuration, it is not necessary to detect the movement quantity of the same object in the direction opposite to the direction his own vehicle is running or to run, thereby realizing the necessary computation for a short time.

Preferably, the approaching object detecting means comprises movement quantity extracting means for extracting a movement quantity of the same object residing between the two images picked up by the image pick-up means and having a component of a direction the driver's own vehicle is running or to run, the extracted movement quantity representing the movement quantity of the approaching object, wherein the approaching degree is detected in terms of a location and magnitude of the movement quantity of the approaching object. In this configuration, even when the image pick-up means is provided at a low position of the vehicle, the danger of collision with the object approaching his own vehicle can be automatically decided, thereby permitting the image pick-up means to be mounted at any height.

Preferably, the movement quantity extracting means extracts, as the movement quantity of the approaching object, the movement quantity of the same object residing between the two images picked up by the image pick-up means minus a changing degree corresponding to running of the driver's own vehicle from the movement quantity of the approaching object. Therefore, even when the movement quantity of the same object is varied because the driver's own vehicle has run slightly, the movement quantity of the object approaching when the driver's vehicle approaches the side direction road can be detected accurately, thereby permitting danger of collision with the object approaching from the side direction road to be decided more accurately.

Preferably, the approaching object detecting means comprises: FOE detecting means 41a-2 for detecting an FOE (focus of extension) in each of the images at intervals of a prescribed time; and the movement quantity extracting means removes a movement quantity of the FOE between the two images as the changing degree. In this configuration, since the changing degree can be removed accurately, danger of collision with the object approaching from the side direction road can be decided more accurately.

Preferably, the approaching object detecting means comprises movement distance detecting means for detecting a distance the driver's vehicle runs for a prescribed time; and the movement extracting means removes a value corresponding to the distance as the changing degree from the movement quantity of the same object. In this configuration, the changing degree can be removed easily.

Preferably, the movement quantity extracting means removes only the changing degree not smaller than a prescribed value. In this configuration, it is not required to remove the changing degree when it is smaller than the prescribed value, thereby realizing the necessary computation for a short time.

Preferably, the approaching object detecting means comprises: FOE detecting means 41a-2 for detecting an FOE (focus of extension) in each of the images picked up at intervals of a prescribed time; and movement quantity extracting means 41a-1 for extracting a movement quantity in a direction diverging from the FOE from a movement quantity of the same object between the two images picked up by the image pick-up means, the extracted movement quantity representing the movement quantity of the approaching object, wherein the approaching degree is detected in terms of a location or magnitude of the movement quantity of the approaching object. In this configuration, by only searching the same object in a single direction diverging from the FOE on the two images picked up at intervals of a prescribed time, the movement quantity of the approaching object can be extracted, thereby realizing the necessary computation for a short time.

The above and other objects and features of the invention will be more apparent from the following description taken in conjunction with the accompanying drawings.

DESCRIPTION OF THE PREFERRED EMBODIMENTS

Now referring to the drawings, an explanation will be given of this invention in connection with various embodiments thereof.

Embodiment 1

Figure 2:
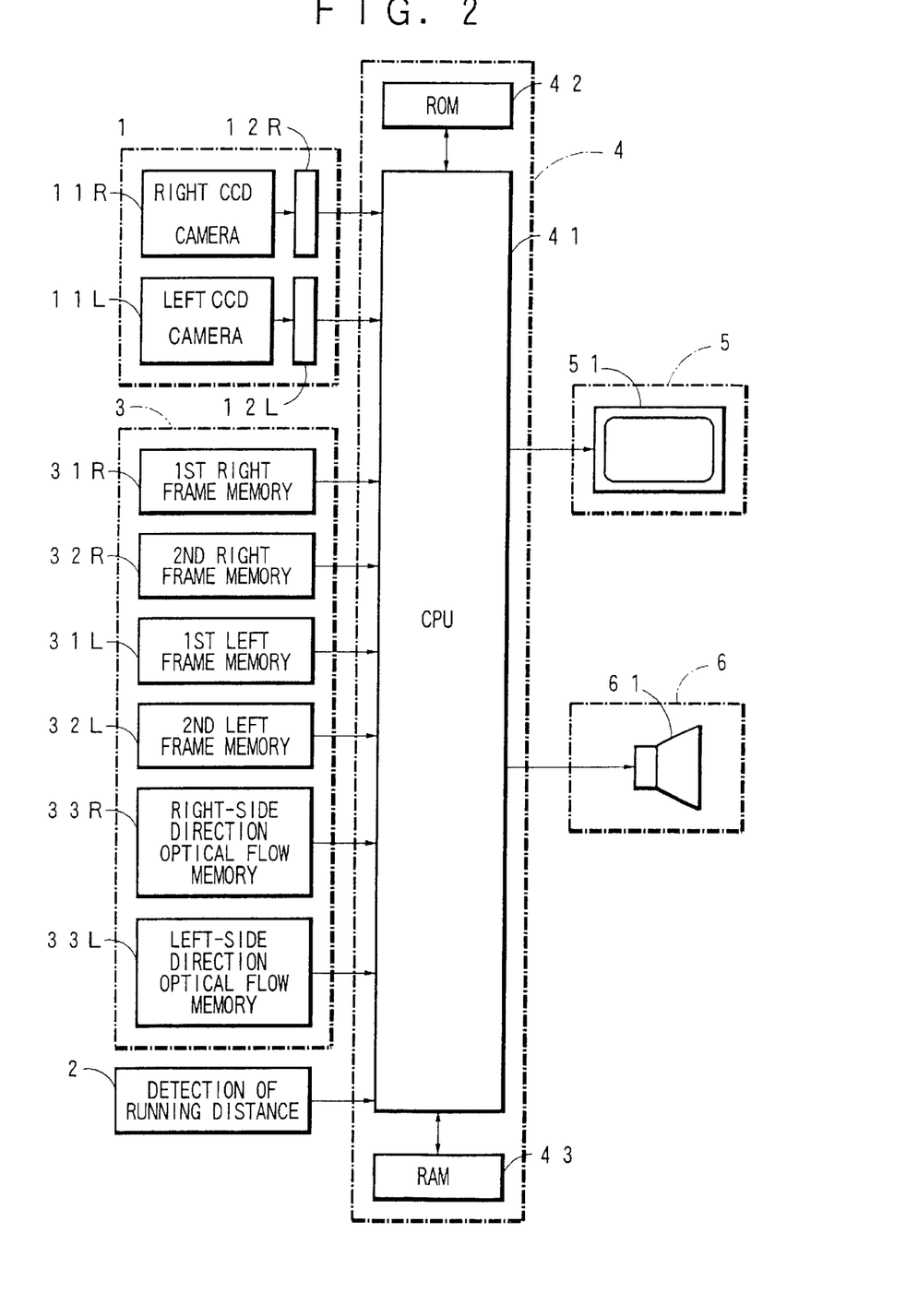
FIG. 2 is a block diagram of the side-monitoring apparatus according to this invention.

FIG. 2 is a block diagram of the side-monitoring apparatus for a motor vehicle according to this invention. In FIG. 2, the side-monitoring apparatus includes an image pick-up unit 1 which is mounted in a vehicle to pick up the images in both side directions, a running distance detecting unit 2 for detecting running distance of a motor vehicle, a storage unit 3 for storing the image and others, a microcomputer 4 (hereinafter referred to as "μCOM 4"), a display 5 for displaying the image picked up by the image pick-up unit and an audio indicating unit 6 for issuing a warning sound or audio guidance.

The image pick-up unit 1 includes a right CCD camera 11R mounted toward a right-side direction of the vehicle, a left CCD camera 11L mounted toward a left-side direction thereof, a right image plane 12R for focusing a right-side direction image picked up by the right CCD camera 11R and a left image plane 12L for focusing a left-side direction image picked up by the left CCD camera 11L. Incidentally, as shown in FIG. 9A, the right CCD camera 11R and the left CCD camera 11L are installed at the front of the vehicle toward both side directions so that the image of the side direction road can be picked up at the position A where the tip of the vehicle protrudes into the side direction road.

The running distance detecting unit 2 may be a running sensor (not shown) which produces a pulse signal whenever the vehicle runs each unit distance.

The storage unit 3 includes first and second right frame memories 31R, 32R, first and second left frame memories 31L, 32L, and right and left optical flow memories 33R, 33L. The first and second right frame memories 31R, 32R temporarily store data pixels with m rows and n columns of 512×512 pixels and luminances of 0–255 levels of gray converted from the right-side direction image focused on the right image plane 12R, and supplies them to the μ COM 4.

The first and second right frame memories 31R, 32R successively store data of pixels with m rows and n columns converted from the right-side direction image picked up at time intervals of Δt in a manner that the memory 31R stores the pixel data at time t, the memory 32R stores the pixel data at time t+Δt, . . . Likewise, the first and second left frame memories 31L, 32L temporarily store data of pixels converted from the left-side direction image focused on the left image plane 12L, and supply them to the μ COM 4.

The first and second left frame memories 31L, 32L also successively store data of pixels with m rows and n columns converted from the right-side direction image picked up at time intervals of Δt in a manner that the memory 31L stores the pixel data at time t, the memory 32L stores the pixel data at time t+Δt, . . . The right and left optical flow memories 34R, 34L store the optical flow data on the right and left side directions, respectively and supply them to the μ COM 4.

The μ COM 4 includes a CPU 41 which operates according to a control program, an ROM 42 which stores the control program for the CPU 41, prescribed setting values, etc. and a RAM 43 which temporarily stores the data necessary to execute the operation of the CPU 41.

The CPU 41 executes the processing of detecting the optical flows corresponding to the movement quantity of the same object on the two images acquired at the time interval Δt therebetween by the cameras 11 (means for acquiring the movement quantity of an approaching object), processing of detecting the distance of a vehicle moving during the time interval Δt (means for detecting the movement distance), and processing of canceling the change of the optical flow according to running of the vehicle when the moving distance is not shorter than a prescribed distance (means of acquiring the movement quantity of the approaching body).

The CPU 41 executes the processing of extracting, from the optical flows detected by the above processing of detecting the optical flow, an optical flow corresponding to the approaching body such as another vehicle or person which approaches from a side direction rode which intersects a lane at issue, processing of determining the danger of collision with the approaching object on the basis of the location and magnitude of the optical flow (danger deciding means), and processing of issuing a warning video signal and/or a warning audio signal to a display 5 and/or an audio indicator 6, respectively when it is decided there is a danger in the danger deciding processing.

The display unit 5 has a display 51 which displays the right-side direction image and the left-side direction image picked up by the CCD cameras 11R and 11L in parallel, or a message based on the warning image signal issued when it is decided by the $\mu$ COM 4 that there is a danger of collision with the approaching object, thereby informing the driver of the danger as visual information.

The audio indicating unit 6 has a speaker 61 which issues audio guidance or warning sound based on the warning image signal issued when it is decided by the $\mu$ COM 4 that there is a danger of collision with the approaching object, thereby informing the driver of the danger as audio information.

Figure 3A:
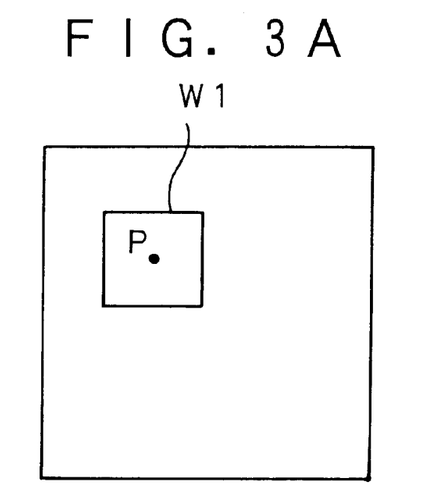
FIGS. 3A to 3C are views for explaining the processing of detecting an optical flow in first and second embodiments.
Figure 3B:
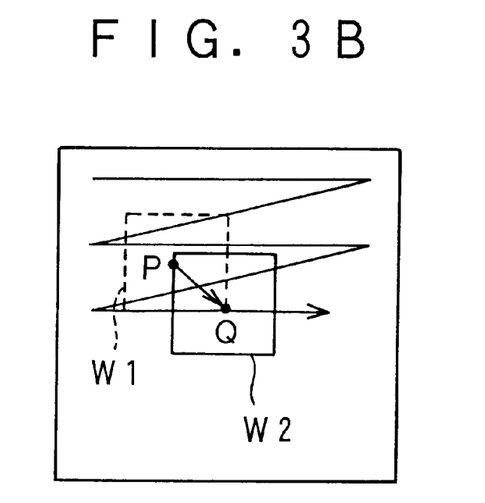

Now referring to FIGS. 3 to 5, an explanation will be given of the operation of the side-monitoring apparatus for a motor vehicle. The CPU 41 executes the processing of detecting the optical flow corresponding to the movement quantity of the same object on the two images acquired at the time interval $\Delta t$ in order to decide the danger of collision with the object which approaches from the right-side direction road. An explanation will be given of the procedure of acquiring the optical flow. First, in the pixel data acquired form the first right frame memory 31R, a window W1 is set for a pixel Q at issue on the right-side direction image picked up at timing t (FIG. 3A). Next, in the pixel data acquired form the second left frame memory 32R, a window W2 having the same size as that of the window W1 is set for a pixel Q at issue on the right-side direction image picked-up at timing t+$\Delta t$, and a correlative value of window W2 with the window W1 is calculated while the window W2 is moved on the entire image region or its peripheral image region (FIG. 3B). The point Q in the window W2 where the correlative value is maximum is taken as a point corresponding to the point P, i.e. the point on the same object. The moving quantity PQ of the same object is detected as an optical flow.

Figure 4A:
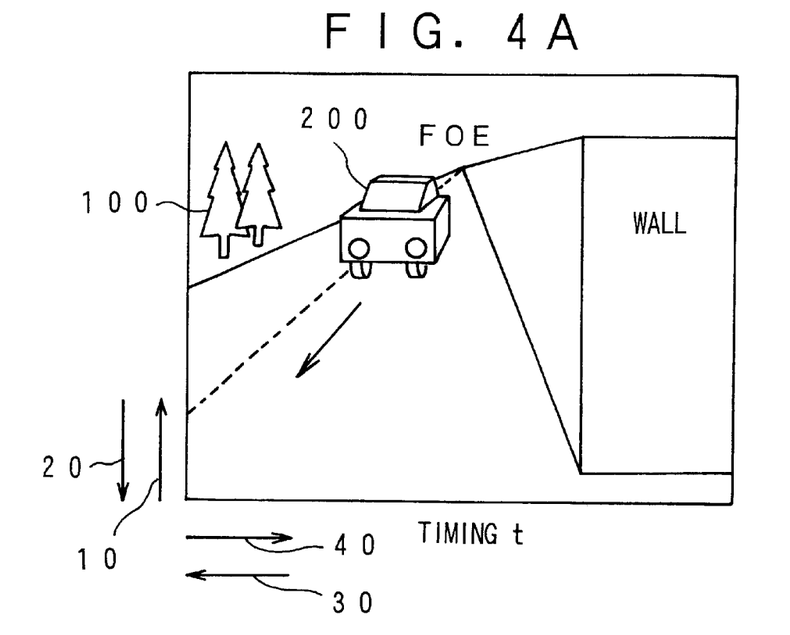
FIGS. 4A and 4B are views for explaining a picked-up image and an optical flow derived therefrom at times t and t+Δt, respectively.
Figure 4B:
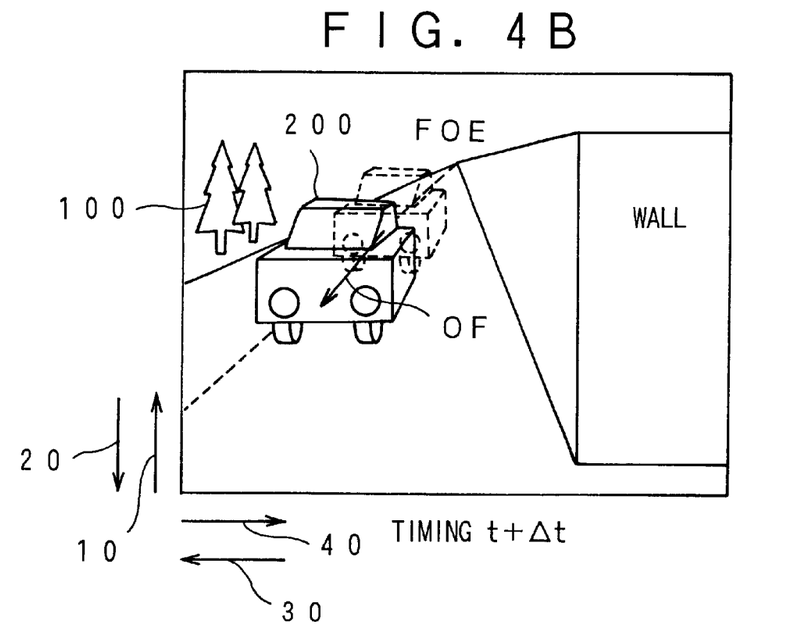

Referring to FIG. 4, an explanation will be given of the processing of extracting only the optical flow generated by the approaching object from the above detected optical flow. FIGS. 4A and 4B show the images picked up at timings t and t+$\Delta t$ by the right CCD camera 11R when the vehicle is stopping at the position where only its tip protrudes into the side direction road. As seen, when the vehicle is stopping, the stationary object 100 such as a traffic sign and tree planted along the side direction road produces a still image but not produce an optical flow.

The object (not shown) which is leaving from the driver's own vehicle moves on the image during the prescribed time $\Delta t$ in a leaving direction 10 and backward direction 40. Therefore, it produces an optical flow OF composed of the components of the leaving direction 10 and backward direction 40. On the other hand, the object 200 which is approaching the driver's own vehicle moves on the image during the prescribed time $\Delta t$ in an approaching direction 20 (direction approaching the driver's own vehicle) and a forward direction 30 (the advancing direction of the driver's own vehicle).

Therefore, it produces the optical flow OF composed in the approaching direction 20 and the forward direction 30. Thus, of the detected optical flows, the optical flow having the component of the approaching direction 20 or the forward direction 30 can be extracted as the optical flow generated from the approaching object.

However, if the camera unit is attached to the relative low position of the vehicle, since the position of FOE (focus of expansion moves in the approaching direction 20, the approaching object does not move almost in the approaching direction 20 but moves only in the forward direction 30. The leaving object also does not almost move in the leaving direction 10, but moves only in the backward direction 40. Therefore as long as the camera unit 1 is attached at a relatively high position of the vehicle, the optical flow having the component of the approaching direction 20 can be extracted as the optical flow from the approaching object. However, according to the position where the camera unit 1 is located, the movement of the approaching object in the approaching direction disappears, the optical flow actually generated by the approaching object may not be extracted.

Meanwhile, more often than not, the camera unit 1 is attached to the low position such as the bumper of a vehicle. Therefore, in order that the optical flow from the approaching object can be extracted regardless of the position of the camera unit 1, the optical flow having the forward direction 30 is preferably extracted as the optical flow of the approaching object. This is also assumed in the following description.

Figure 5A:
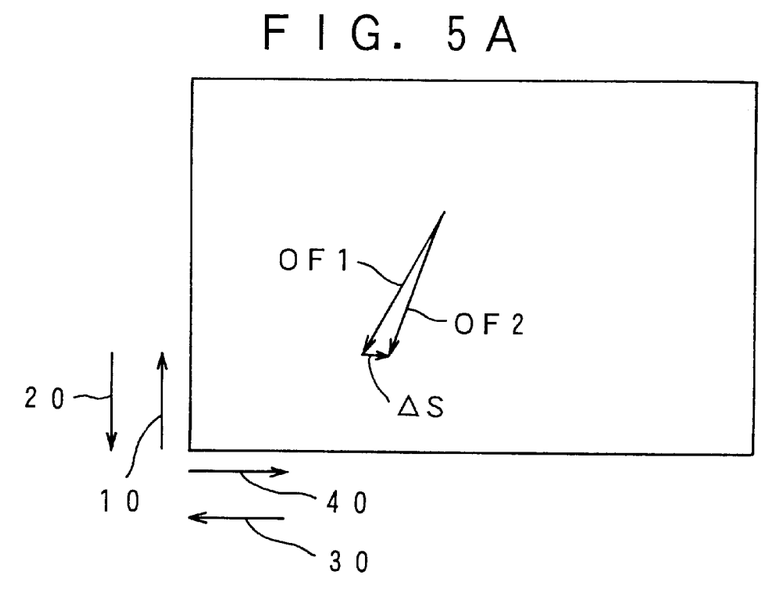
FIGS. 5A and 5B are views for explaining the processing of canceling which is performed by a CPU.

Meanwhile, while the driver's own vehicle is running at a reduced speed in the vicinity of position A as shown in FIG. 9A, as seen from FIG. 5A, the optical flow OF2 generated from the approaching object 200 changes by a changing degree $\Delta S$ corresponding to the movement of the vehicle as compared with that when the vehicle stands still. However, if the changing degree $\Delta S$ is small, the optical flow OF2 does not shift toward the backward direction, but it can be extracted as the optical flow from the approaching object.

Figure 5B:
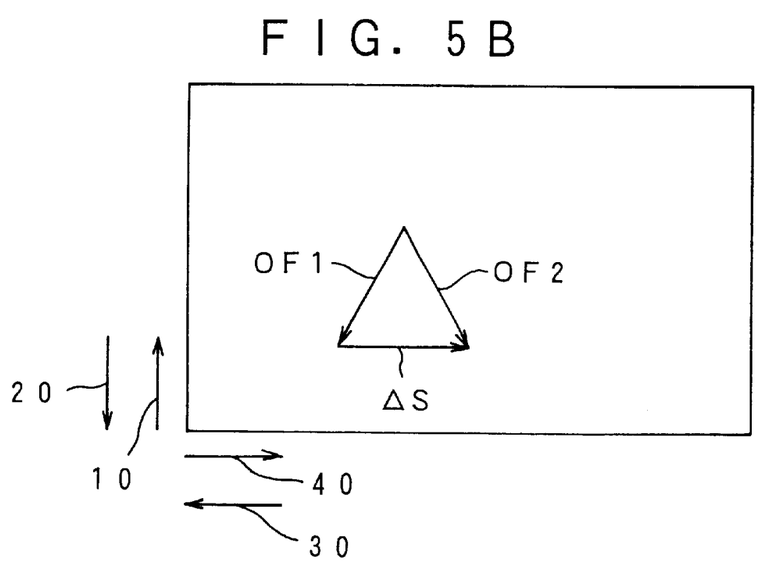

On the other hand, if the changing degree $\Delta S$ is large, as seen from FIG. 5B, the optical flow OF2 from the approaching object is shifted in the backward direction by the changing degree $\Delta S$ that is not negligible. In this case, the optical flow which must be extracted as that from the approaching object will be removed. Therefore, if the changing degree $\Delta S$ is not smaller than a prescribed degree, it is required that the canceling processing of subtracting the changing degree is made from each of all the detected optical flows OF2 and thereafter the optical flow is extracted.

Through the same processing, the optical flow generated from the object approaching the driver's own vehicle from the left-side direction road is also extracted.

As a next step, the CPU 41 performs the processing of deciding the danger of collision with the approaching object.

The size of the optical flow from the approaching object increases as the distance between itself and the driver's own vehicle decreases and its relative speed is higher. Therefore, there is more danger of collision as the size of the optical flow from the approaching object is larger. Further, as the distance between the driver's own vehicle and the approaching object is shorter and the relative speed of the approaching object is higher, the position of the optical flow of the approaching object is shifted toward the forward direction 30 on the image. When it is decided that there is a danger of collision, a warning audio signal or a warning video signal is issued for the display unit 5 or the audio indicating unit 6. In this way, since it is automatically decided whether or not there is a danger of collision with the approaching object on the basis of the location and magnitude of the optical flow from the approaching object extracted from the images picked up by the camera 11, the status of the side direction road can be known accurately.

Figure 6:
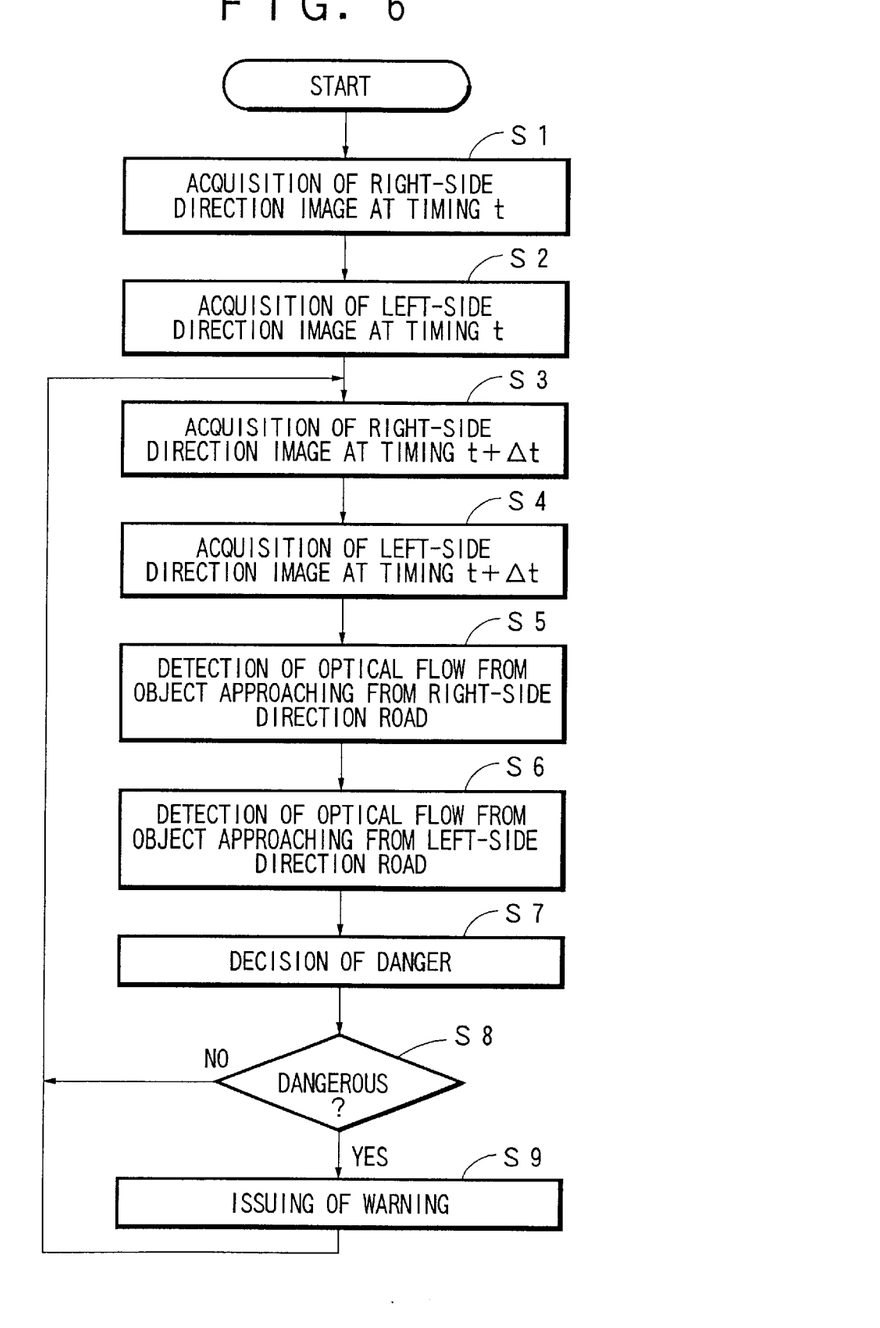
FIG. 6 is a flowchart for explaining the procedure of processing in the CPU.
Figure 7:
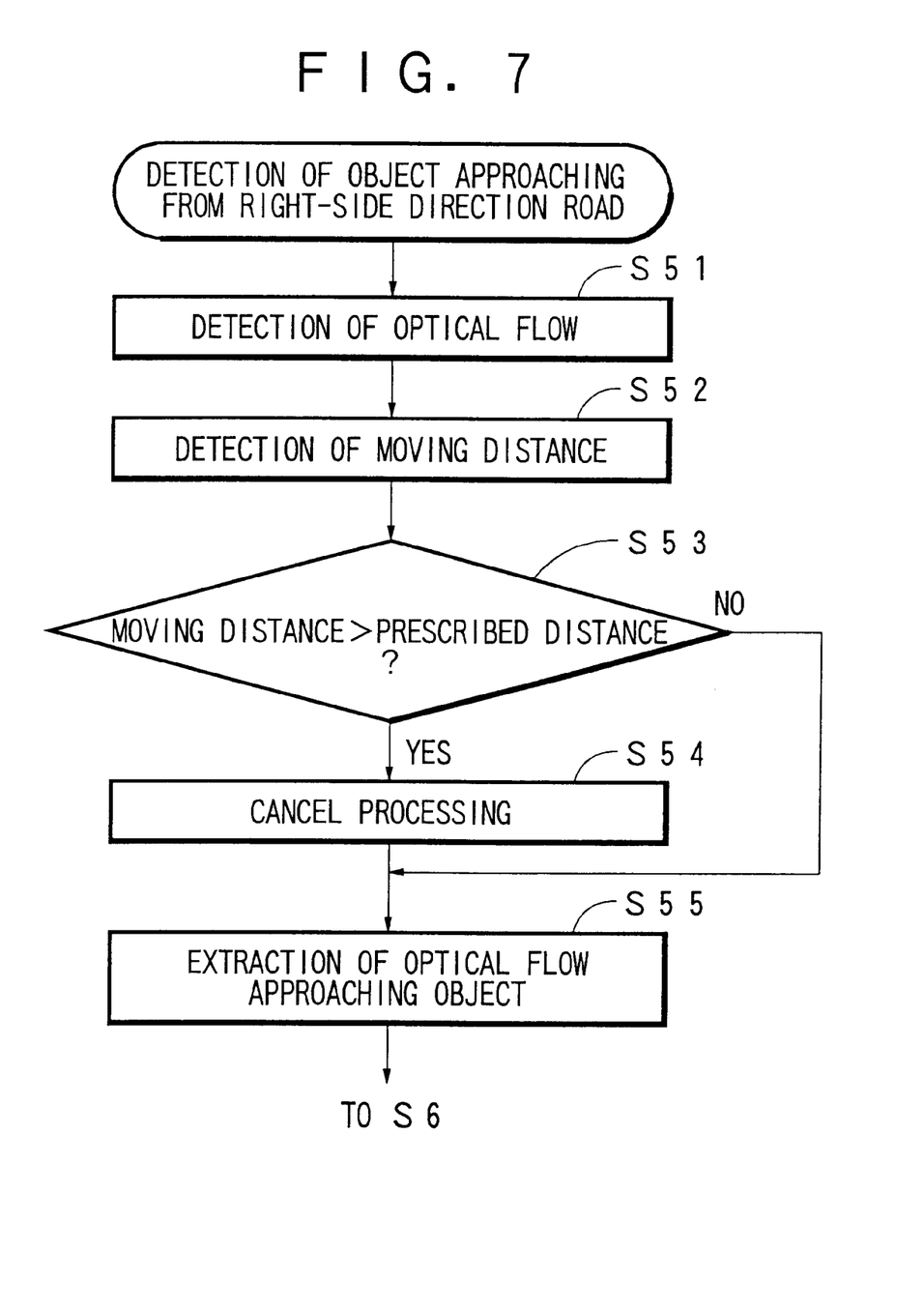
FIG. 7 is a flowchart showing the details of the processing of detecting an optical flow which is produced from an approaching object on a right side direction road in FIG. 6.

Now referring to the flowchart showing the processing procedure of the CPU 41 shown in FIGS. 6 and 7, a detailed explanation will be given of the operation of the side-monitoring apparatus which has been roughly described above.

First, the right-side direction image at timing t, as shown in FIG. 3, is acquired from the right CCD camera 11R. The pixel data corresponding to the right-side direction image are stored in the first right frame memory 31R (step S1). Likewise, the pixel data corresponding to the left-side direction image are stored in the first left frame memory 31L (step S2)

Next, the pixel data corresponding to the right-side direction image and the left-side direction image at timing t+∆t are stored in the second right frame memory 32R and the second left frame memory 32L, respectively (steps S3 and S4). The optical flow generated from the approaching object on the right-side direction road is detected on the basis of the right-side direction images at timings t and t+t∆ stored in the first and the second right memory 31R, 32R (step S5).

Now, referring to the flowchart of FIG. 7, a detailed explanation will be given of the processing in step S5. In step S51, the movement of the same object on the right-side direction images at timing t and timing t+t∆ is detected as the optical flow. The optical flow thus detected is stored in the right-side direction optical flow memory 33R (step S51).

The moving distance when vehicle has moved during the prescribed time interval t∆ is detected on the basis of the running distance information acquired by the running distance detecting unit 2 (step S52). If the moving distance is longer than a prescribed distance, it is decided that the changing degree ∆S is larger than a prescribed value (YES in step S53). In this case, the processing of cancellation is performed (step S54). If the moving distance is not larger than the prescribed distance, it is decided that the changing degree ∆S is not larger than the prescribed value. In this case, the processing directly proceeds to step S55. In this way, since the processing of canceling is not performed where the changing degree ∆S is not larger than the prescribed value, the quantity of computation is reduced.

In the processing of cancellation, the changing degree ∆S corresponding to the moving distance acquired in step S52 is computed. The changing degree ∆S is subtracted from each of the optical flows stored in the right-side direction optical flow memory 33R (step S54). In step S55, from all the optical flows detected in step S51 or the optical flow(s) subjected to the processing of canceling, the optical flow(s) having the component of the approaching direction 20 is extracted and the optical flow(s) having the component of the backward direction 40 is removed. Thus, the optical flow from the approaching object is extracted (step S55). The processing proceeds to step S6 in FIG. 6.

In step S6, the same processing as in step S5 is performed for the left-side direction image so that the optical flow generated from the approaching object on the left-side direction road is detected. Next, on the basis of the location and magnitude of the optical flow thus extracted, the processing of deciding the danger of collision with the approaching object is performed (step S7). If it is decided that there is a danger of collision (YES in step S8, the processing of issuing a warning is performed (step S9).

In the processing of issuing a warning, it is decided whether or not the optical flow from the approaching object decided "dangerous" has been extracted from the right-side direction image or the left-side direction image. If it has been extracted from the right-side direction image, it is decided that there is a danger of collision with the approaching object on the right-side direction road. The warning video signal or warning audio signal indicative of this decision is supplied to the display unit 5 or the audio indicating unit 6. In response to such a signal, the display unit 5 displays on the display 51 that "there is a vehicle approaching from the right-side direction road", and the audio indicating unit 6 issues an audio guidance that "there is a vehicle approaching from the right-side direction road", thereby informing the driver of the danger of collision.

If it is decided that the optical flow from the approaching object decided "dangerous" has been extracted from the left-side direction image, it is decided that there is a danger of collision with the approaching object on the left-side direction road. The warning video signal or warning audio signal indicative this decision is supplied to the display unit or the audio indicating unit 6. The processing returns to step S3. On the other hand, if it is decided that there is no danger of collision in the processing of deciding the danger (NO in step S8), the processing directly returns to step S3.

In the first embodiment described above, in the processing of canceling, the distance the vehicle has moved during the prescribed time interval ∆t was detected to detect the changing degree ∆S. However, the movement quantity of the FOE during the prescribed time interval ∆t may be used as the changing degree ∆S. At this time, the CPU 41 serves as an FOE detecting means. For example, the FOE can be detected from the crossing point of extended edges of white lines of the side direction road.

In this case, since the movement quantity of the FOE is equal to the changing degree ∆S, this changing degree ∆S can be detected accurately. However, it should be noted that this requires the image processing for acquiring the FOE.

Embodiment 2

Figure 3C:
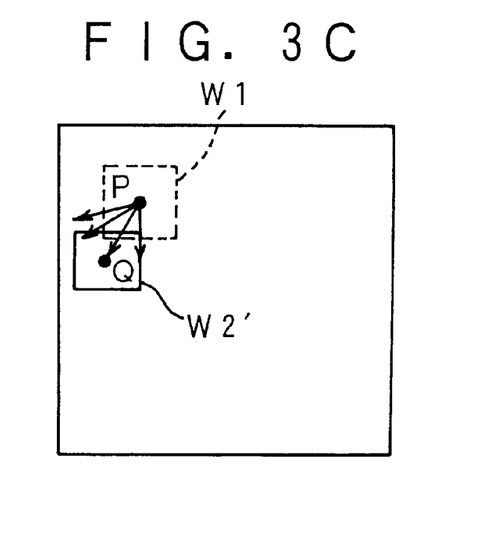

In the first embodiment described above, as long as the cameras 1 are located at a certain height, the movement of the same object between two images was detected in the manner illustrated in FIG. 3 and the optical flow having the component of the approaching direction was extracted as that from the approaching object. However, where the optical flow having the components of both forward direction 30 and approaching direction 20 is extracted as that having the component of the approaching direction 20 as shown in FIG. 4, as shown in FIG. 3C, the window W2' corresponding to the window W1 may be moved in both approaching direction 20 and forward direction 30 of the directions diverging from point P.

Such detection of the optical flow does not require to search the same object having the component in the backward direction 40. This permits the reduction of the quantity of computation and high speed thereof as compared with the manner of searching the same object from the entire image as shown in FIGS. 3A and 3B.

Embodiment 3

Figure 8A:
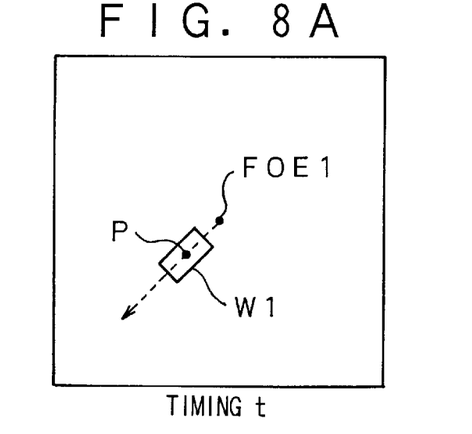
FIGS. 8A to 8C are views for explaining the processing of detecting an optical flow in a third embodiment.

In the embodiments described above, the movement of the same object between the two images were detected in the manner illustrated in FIGS. 3A–3C. However, it may be detected using the FOE on the image. Now, referring to FIGS. 8A to 8C, an explanation will be given of the procedure of detecting the movement of the same object between the two images using the above FOE. First, as shown in FIG. 8A, on the image picked up at timing t, a slender window W1 is set around a certain point P in a radial direction of an FOE 1 (i.e. in the direction of connecting the FEO 1 to the point P).

Figure 8B:
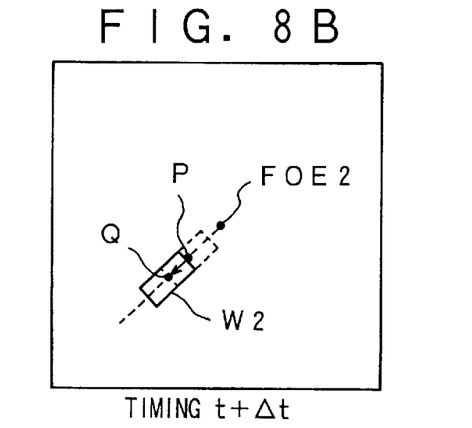
Figure 8C:
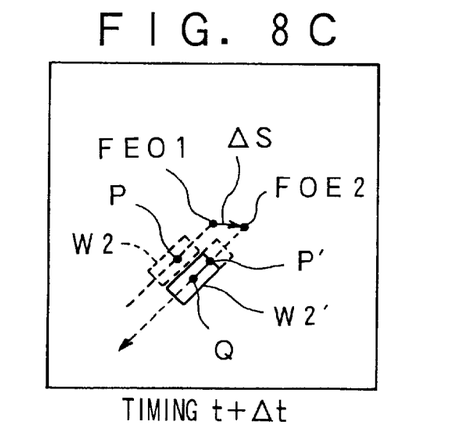

On the image picked up at timing t+tΔ, while the window W2 corresponding to the window W1 is shifted one point by one point in the radial direction from FOE 2, its correlative value with the window W1 is computed. The point Q in the window W2 where the correlative value is maximum is taken as the point corresponding to the point P, i.e. the point on the same object. The movement quantity PQ of the same object can be detected as the optical flow.

Where the vehicle is reducing the speed, on the image picked up at timing t+Δt, while the window W2' when displaced by the movement quantity between FEO 1 and FEO 2(=changing degree ΔS) from the window W2 corresponding to the window W1 (P is shifted to P') is moved point by point, the correlative value of the window W2' with the window W1 (FIG. 8C). The point Q in the window W2' where the correlative value is the greatest is taken as the point corresponding to the point P, i.e. the point on the same object. Assuming that the point P in the window W1 has been displaced from point P', the movement P'Q of the same object can be detected as the optical flow with the changing degree ΔS removed.

In this way, since the same point (i.e. same object) is searched in the direction diverging from the FOE, its quantity of computation can be reduced and the speed thereof can be increased as compared with the case where the same point is searched from the entire image as illustrated in FIG. 3.

In the first to third embodiments described above, the cameras were attached to the front end of the vehicle. However, if the cameras are attached to the rear end of the vehicle, also when the driver put the vehicle out by backward movement from the garage facing the side direction road, the driver can monitor the image in the side direction.

In the first to third embodiments described above, the approaching degree of the approaching object was detected on the basis of the movement quantity of the same object between the two images picked up at two timings apart by the prescribed time interval. However, for example, a stereophonic system in which the positions of the approaching object are detected by two cameras may be adopted. In this stereophonic system, the approaching degree of the approaching object can be detected from the positions of the approaching object detected on the images picked up at two timings apart by a prescribed time.

What is claimed is:

1. A side-monitoring apparatus for a motor vehicle comprising:
   image pick-up means mounted in the motor vehicle for picking up an image in a side direction of the vehicle;
   approaching object detecting means for detecting approaching degree of an approaching object which approaches a driver's own vehicle from a side direction road crossing the driver's own vehicle on the basis of two image picked up at two timings apart by a prescribed interval by said image pick-up means, wherein an optical flow for each object in the two images is determined and optical flows having a backward direction are eliminated; and
   danger decision means for deciding a danger on the basis of said approaching degree and the location and magnitude of the optical flows, wherein said approaching degree is changed based upon movement of the object in the two images in the two timings and movement of the driver'own vehicle.

2. A side-monitoring apparatus for a motor vehicle according to claim 1, wherein said approaching object detecting means comprises
   movement quantity extracting means for extracting a movement quantity having a component of a direction approaching the driver'own vehicle from a movement quantity of the approaching object between said two images picked up by said image pick-up means, an extracted movement quantity representing the movement quantity of the approaching object, wherein said approaching degree is detected in terms of a location or magnitude of said movement quantity of said approaching object.

3. A side-monitoring apparatus for a motor vehicle according to claim 2, wherein said movement quantity extracting means extracts the movement quantity of the approaching object by detecting only the movement quantity of the same object having the component of a direction approaching the driver'own vehicle and a component of the direction his own vehicle is running or to run.

4. A side-monitoring apparatus for a motor vehicle according to claim 1, wherein said approaching object detecting means comprises movement quantity extracting means for extracting a movement quantity of the approaching object between said two images picked up by said image pick-up means and having a component of a direction the driver's own vehicle is heading or about to head, the extracted movement quantity representing the movement quantity of the approaching object, wherein said approaching degree is detected in terms of a location or magnitude of said movement quantity of said approaching object.

5. A side-monitoring apparatus for a motor vehicle according to claim 4, wherein said movement quantity extracting means extracts said movement quantity of the same object between said two images picked up by said image pick-up means minus a changing degree corresponding to running of the driver's own vehicle as said movement quantity of said approaching object.

6. A side-monitoring apparatus for a motor vehicle according to claim 5, wherein said approaching object detecting means comprises:
   FOE detecting means for detecting an FOE (focus of expansion) in each of the two images at prescribed time intervals; and
   said movement quantity extacting means removes a movement quantity of the FOE between said two images as said changing degree.

7. A side-monitoring apparatus for a motor vehicle according to claim 5, wherein said approaching object detecting means comprises movement distance detecting means for detecting a distance the driver's own vehicle runs for a prescribed time; and
   said movement extracting means removes a value corresponding to said distance as said changing degree from said movement quantity of the same object between said two images picked up by said image pick-up means.

8. A side-monitoring apparatus for a motor vehicle according to claim 5, wherein said movement quantity extracting means removes only said changing degree not smaller than a prescribed value.

9. A side-looking apparatus for a motor vehicle according to claim 1, wherein said approaching object detecting means comprises:

FOE detecting means for detecting an FOE (focus of expansion) in each of the two images at prescribed time intervals; and movement quantity extracting means for extracting a movement quantity in a direction diverging from said FOE from a movement quantity of the approaching object between said two images picked up by said image pick-up means, an extracted movement quantity representing the movement quantity of the approaching object, wherein said approaching degree is detected in terms of a location or magnitude of said movement quantity of said approaching object.

* * * * *